July 17, 1956

E. L. CLEMENTS 2,754,932

WHEEL-ACTUATED LUBRICATING DEVICE
WITH TRAVELING INJECTOR

Filed April 17, 1953

INVENTOR.
EARL L. CLEMENTS
BY
ATTORNEYS

INVENTOR.
EARL L. CLEMENTS

July 17, 1956 E. L. CLEMENTS 2,754,932
WHEEL-ACTUATED LUBRICATING DEVICE
WITH TRAVELING INJECTOR
Filed April 17, 1953 4 Sheets-Sheet 4

INVENTOR.
EARL L. CLEMENTS
BY *Isler & Ornstein*
ATTORNEYS

United States Patent Office 2,754,932
Patented July 17, 1956

2,754,932

WHEEL-ACTUATED LUBRICATING DEVICE WITH TRAVELING INJECTOR

Earl L. Clements, Cleveland, Ohio

Application April 17, 1953, Serial No. 349,370

7 Claims. (Cl. 184—15)

This invention relates in general to automatic lubricating mechanisms and more particularly to a device for effecting the automatic lubrication of wheels rolling on a fixed track.

The invention is particularly directed toward the automatic lubrication of the wheels of monorail overhead conveyor systems although the principles thereof can be readily adapted to the lubrication of various wheels which move in a fixed path and require periodic attention.

The lubrication of monorail conveyors is of special importance when the conveyor must travel through areas of elevated temperature, such as ovens or the like. Under these conditions, the grease or other lubricant in the wheels is overheated and liquifies rapidly. The natural viscosity of the lubricant is destroyed and it becomes thin and flows out of the wheel portion where it is normally retained.

In order to maintain proper lubrication of the conveyor wheels under such adverse conditions, many industrial concerns have men stationed at the points where the conveyor leaves a heated area, for example, at the exit and of an infra-red drying oven, and these men lubricated the wheels each time they pass by.

Such lubricating stations are also utilized when the conveyor travel is very long, say 2500 feet or more, and requires continual preventitive maintenance.

It is the primary object of my invention to provide a lubricating device which will effect automatic lubrication of conveyor wheels under conditions, such as described above, which make proper maintenance difficult and costly.

Another object of my invention is to provide a device of the character described which will travel with each wheel for a sufficient period of time to permit adequate lubrication.

A further object of my invention is to provide a device of the character which can be adjusted to meet various conditions of size and speed in the conveyor.

Other objects and advantages of my invention will be apparent during the course of the following description. In the accompanying drawings forming a part of this specification and in which like numerals are employed to designate like parts throughout the same, Fig. 1 is a top plan view of a lubricating device embodying the features of my invention; the device being shown mounted in operative position on a rail or track.

Figure 6:
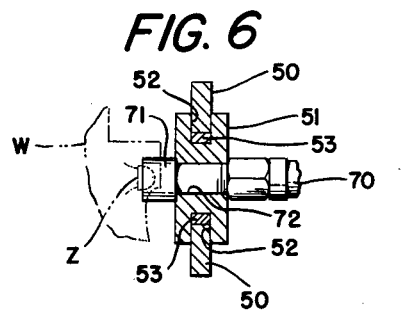
Fig. 6 is a fragmentary cross-sectional view taken on line 6—6 of Fig. 2 and showing the lubricant injector in engagement with a wheel.

Referring more particularly to the drawings I have illustrated a conventional track or rail 10 which forms part of a monorail overhead conveyor. Mounted on the track 10 is a suspension yoke Y having a pair of opposed wheels W which travel on the track in a well-known manner. As best seen in Fig. 6, each of the wheels W is provided with a pressure-type lubricating fitting Z which is secured to the wheel centrally thereof.

The track 10 is in the form of a structural I-beam having an upper flange 11, a lower flange 12 and a web 13. The wheels W roll on the divided surface 14 of the lower flange 12.

The lubricating device is conveniently mounted on the upper flange 11 of the track 10 by means of mounting pads 15 and angle brackets 16 which are secured to the pads by means of screws 17.

To each of the longitudinally spaced angle brackets 16 is fixedly secured, as by screws 18, extending through slots 73 in the bracket 16 a supporting member 19 which is in the form of a plate which extends transversely of the track 10. The plate or member 19 is provided with two horizontally-spaced openings 20 in which are mounted flanged sleeve bearings 21. A rod or shaft 22 extends longitudinally between each opposed pair of openings 20 and is journalled in the sleeve bearings 21.

By reference to the drawings, it will be noted that the lubricating device is symmetrical in design and consists of two oppositely disposed identical halves. For purposes of clarity, I will described only one of these halves, it being understood that the parts described are duplicated in the design of the device.

On the shaft 22 is mounted a rocker assembly 23 which functions to bring the lubricant injector into operative position as well as to open the lubricant valve, as will more fully appear hereinafter. The rocker assembly includes two longitudinally-spaced rocker arms 24 which are pressed onto the shaft 22 adjacent the collar or flange 25 of the sleeve bearing 21. Each of the arms 24 has a laterally projecting finger 26 which extends toward the track 10. The arms 24 also include a vertically-extending upper portion 27 and a somewhat longer and wider vertically extending lower portion 28.

A bar 29 is secured to the free ends of the fingers 26, as by welding or the like, to rigidly connect the two arms 24. The bar 29 is provided, intermediate the ends thereof, with an extension which may be a vertically extending ear or tab 30 which is fixedly secured to the bar by a screw 31. The tab 30 is apertured as at 32 to receive and anchor one end of a link 33 which is, in my preferred embodiment, of the special coil spring design shown in the drawings. The link 33 comprises a primary expansion coil spring 34 and means for varying the effective length of the spring. The adjusting means may be a second expansion coil spring 35, of smaller diameter than spring 34, which will threadedly engage the spring 34.

The end of spring 35, which is equivalent to the other end of adjustable link 33, is secured to one arm 36 of a bellcrank 37 which is rotatably mounted on shaft 22. Collars 38, which are fixedly secured to shaft 22 on either side of bellcrank 37, serve to prevent any longitudinal movement of lever 37 on shaft 22. The other arm 39 of the bellcrank overlies the actuating mechanism of the lubricating device, which will now be described.

Fixedly secured to the upper surface 11 of track 10, as by screws 40, is a base plate 41 of rectangular form. A portion of flange 11, on either side of the web 13, under the plate 41, is cut away or recessed as indicated by reference character 42 so as not to interfere with the parts now to be described. A guide bushing 43 is mounted in the plate 41 and secured by means of a nut 44. A headed pin 45 having a rounded end 46 is slidably mounted in the bushing 43 with the end 46 extending well below the plate 41. The end of the pin 45 is adapted to engage a hinge plate 47 which is pivotally secured to the underside of base plate 41 by means of a hinge pin 48 which extends through spaced sleeves 49 which are welded to the hinge plate 47. As will appear more fully hereinafter, the hinge plate is normally out of abutment with the pin 45 and engages the pin only when energized by the passage of a wheel W.

Secured to the lower portion 28 of the rocker arms 24 are two longitudinally extending parallel slide bars 50 between which is mounted a slide block 51. The block 51 is recessed as at 52 to slidably engage the bars 50, a bearing strip 53 being disposed intermediate the block 51 and bars 50 as an anti-friction element. The bearing strip 53 is hooked at its ends 54 to maintain it in position.

The block 51 is provided with two parallel longitudinally extending cavities 55 into each of which is pressed a long guide rod 56 whose free end extends through an aperture 57 provided in the lower portion 28 of the rocker arm 24. Each of the guide rods 56 has a compression coil spring 58 mounted thereon. One end of the spring 58 bears against the rocker arm 24 and the other end bears against an abutment strip 59 which is slidably mounted on the guide rods 56 adjacent the block 51. The action of the springs 58 urges the slide block 51 to the right as viewed in Figs. 1 and 2. For the purpose of limiting and controlling the extent of such movement, an adjustable stop 60 is threadedly secured in the adjacent rocker arm 24 and engages an embossment 61 provided on slide block 51 for this purpose. A nut 62 on the stop 60 is utilized to retain the stop in a selected position.

Figure 1:
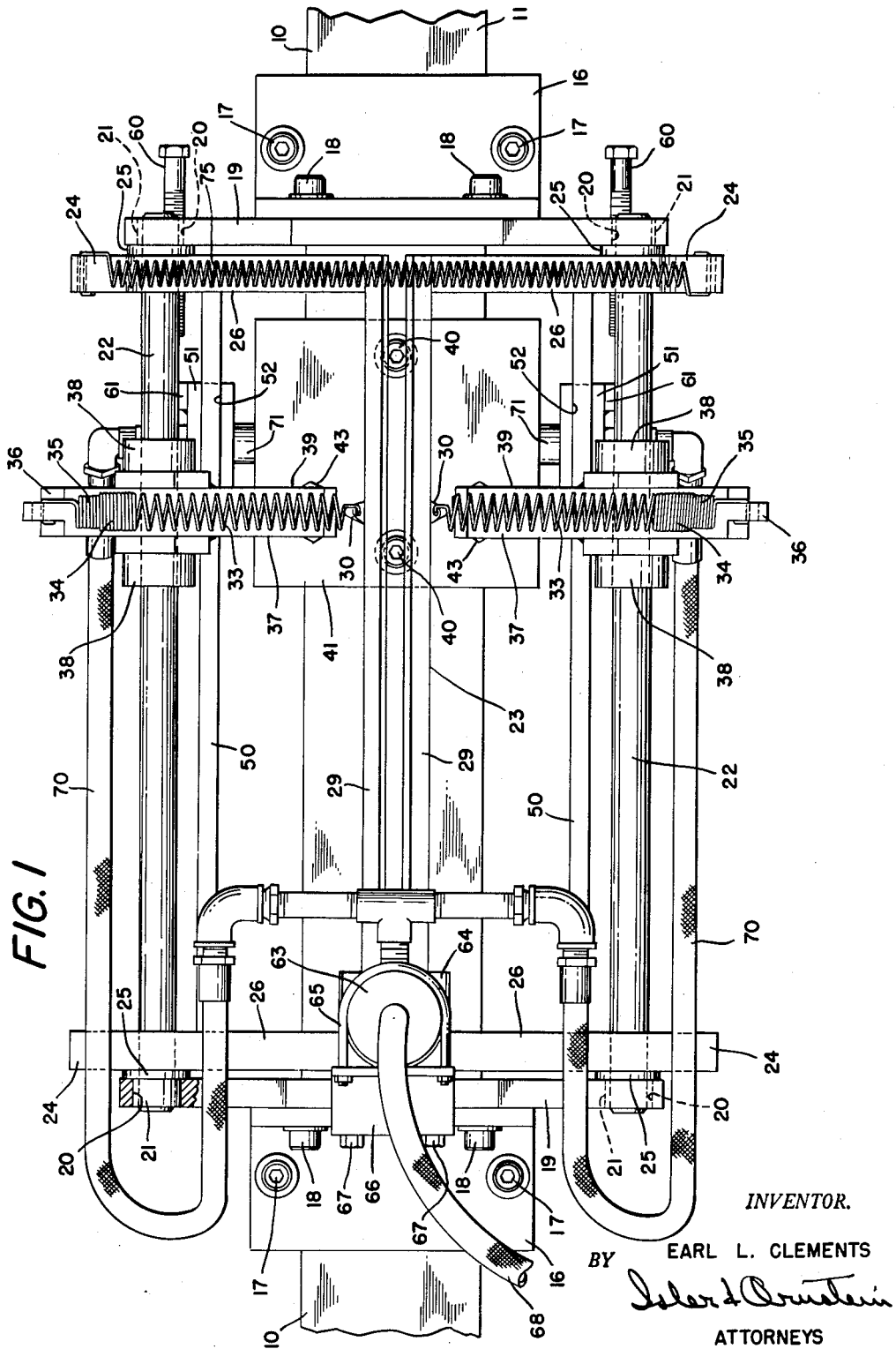
Figure 2:
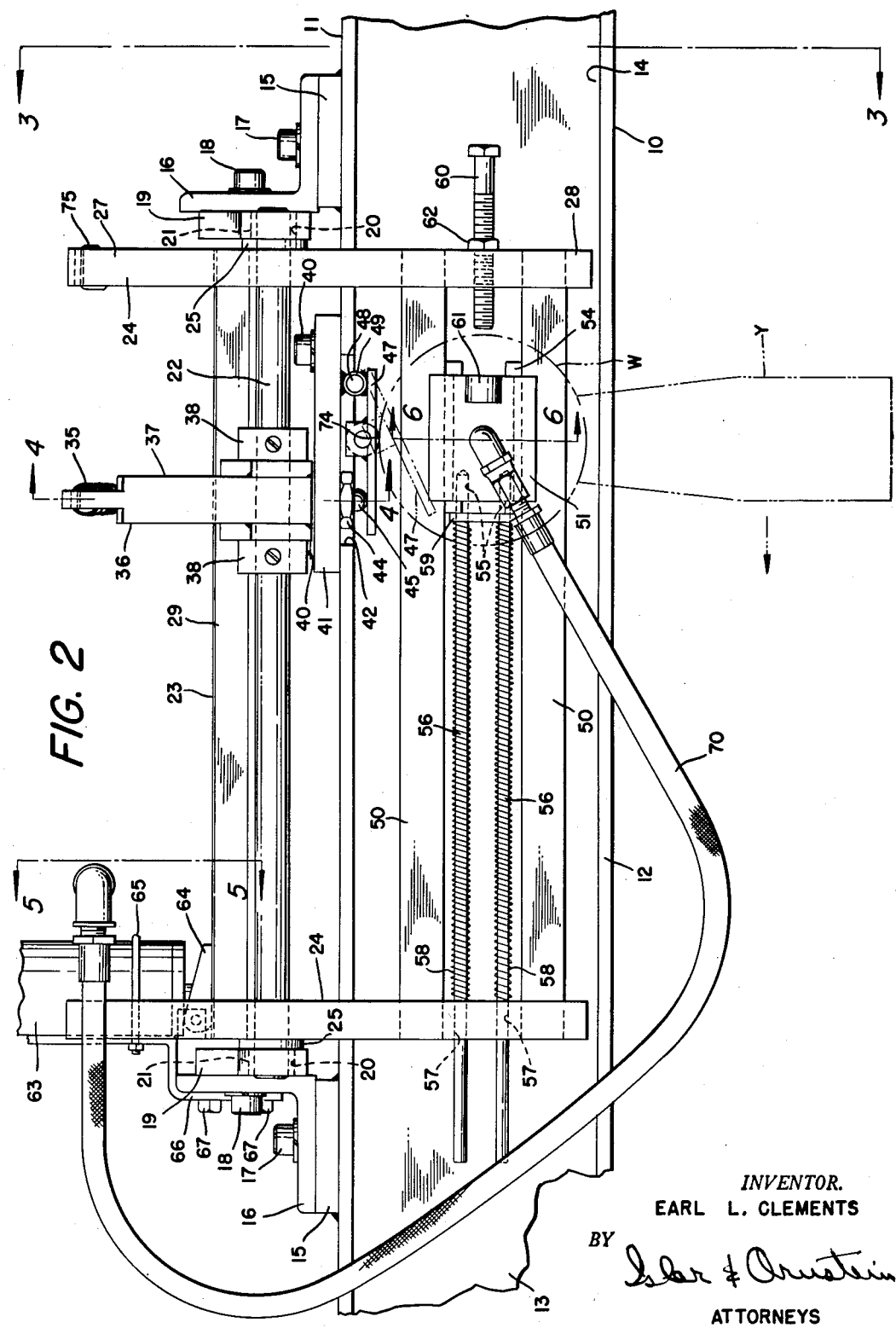
Fig. 2 is a side elevation of the device shown in Fig. 1.
Figure 3:
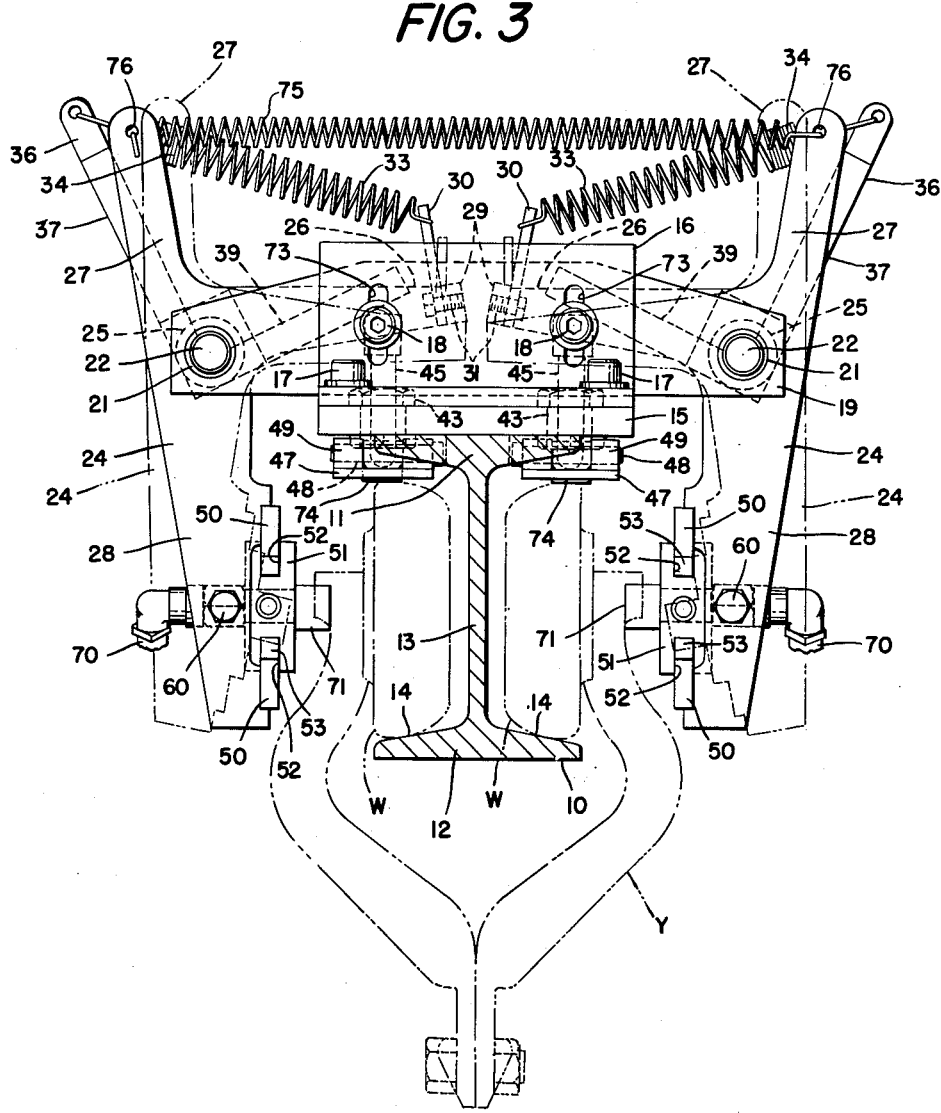
Fig. 3 is an end view of the device, taken as indicated by line 3—3 of Fig. 2.
Figure 5:
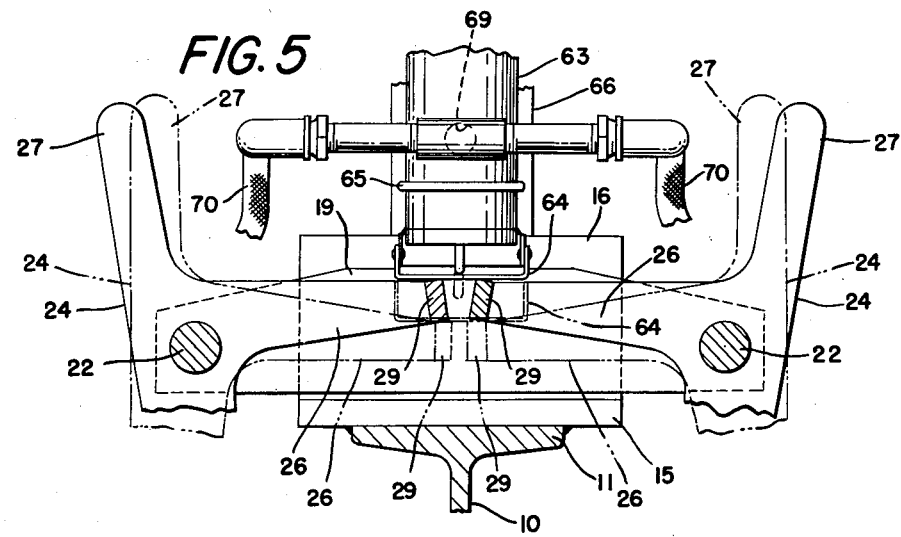
Fig. 5 is a view, partially in section, of the lubricant valve, taken as indicated by line 5—5 of Fig. 2.

As best seen in Figs. 1, 2 and 5 of the drawings, a conventional lubricant control valve 63, with lever actuation 64, is secured by means of U-bolts 65, bracket 66 and cap screws 67 to one of the angle brackets 16 so that its actuating lever 64 straddles and overlies the bars 29 of the rocker assembly 23. A hose 68, leading from a pressurized lubricant reservoir (not shown) is connected to the valve 63 in a suitable manner. The outlet 69 of the valve is connected by suitable fittings to two injector hoses 70. The other end of each of the hoses 70 is equipped with a conventional grease injector fitting 71 which, in turn, is fixedly secured in an opening 72 provided in the slide block 51. The injector 71 is adapted to engage the lubricating fitting Z on the wheel W, as shown in Fig. 6.

The operation of the lubricating device will now be described.

As the conveyor travels on the track 10, each wheel W will pass the lubricating device. The hinge plate 47 will normally be disposed in a substantially vertical plane, as indicated in broken lines in Figs. 2 and 4. The wheel W, which is traveling in the direction indicated by the arrow in Fig. 2, contacts the hinge plate 47, which is disposed in its path of movement, and causes it to pivot clock-wise to the solid-line position shown in Fig. 2. In order to minimize wear on the hinge plate, it is provided with a roller 74 against which the wheel W bears.

Figure 4:
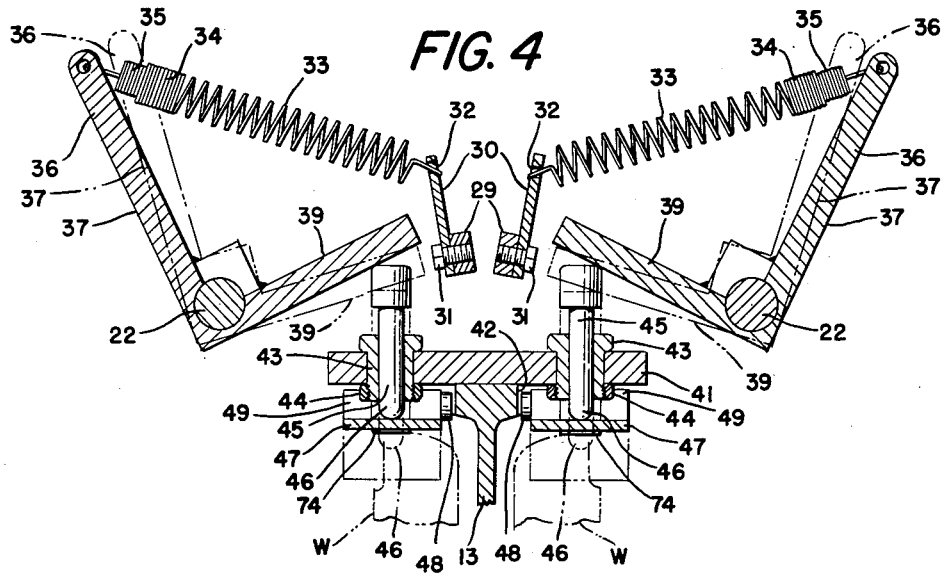
Fig. 4 is a cross sectional view of a portion of the device taken on line 4—4 of Fig. 2.

As best seen by the dotted outline in Fig. 4, the hinge plate engages the pin 45 and displaces it vertically. The pin 45 acts as an actuating element to cause movement of the rocker assembly 23, by engaging the underside of the arm 39 of crankbell 37. Inasmuch as crankbell 37 is free to rotate on shaft 22, the arm 36 pivots outwardly. This outward movement is transmitted through link 33 to the extension 30 on bar 29 thus causing the entire rocker assembly 23 to pivot about the axis of shaft 22.

The lower portion 28 of the rocker arms 24 is thus caused to swing inwardly toward the wheels W and the lubricant injector 71 is pressed into engagement with the fitting Z, as shown in Fig. 6.

At the same time, the bars 29 move upwardly to engage the actuating lever 64 on the lubricant control valve 63, causing lubricant under pressure to be forced through the two hoses 70 and into the wheel W through the injector 71 and fitting Z.

Inasmuch as the wheels W are traveling during the operation of the lubricating device, the injector 71 moves with the wheels. This movement is permitted by the slide block 51 which slides on the slide bars 50 to cause compression of the springs 58.

As soon as the wheel W has traversed the hinge plate 47, the hinge plate swings downwardly and the various parts are restored to their initial positions. An extension coil spring 75 which is secured in apertures 76 of two of the rocker arms 24, serves as a means for causing the counter-rotation of the rocker assembly 23. The coil springs 58 return the slide block 51 to a position of abutment with the stop 60. Thus, the position of the various parts is reestablished for actuation by the succeeding pair of wheels W.

It will be recognized that certain variations in the operation of the conveyor may be desired or necessary from time to time, such as a change in the rate of travel, replacement of wheels or a change in the intervals between the suspension yokes. In anticipation of such variations, I have provided for selective adjustment of the device to meet changing operating conditions as well as to maintain proper registry of the various parts.

There are two methods of varying the duration of the lubricating function. Within narrow limits, the length of link 33 can be changed to effect the duration. If the link 33 is made short so that the spring 34 is always under tension, as shown in the drawings, the crankbell lever 37 will react more quickly to movement of pin 45. This will in turn cause quick response of the rocker assembly 23. If the link 33 is lengthened, so that there is no tension on spring 34, there will be considerable lost motion in the linkage which will cause the crankbell 37 and rocker assembly 23 to react sluggishly and the injector 71 will not engage the wheel W as quickly as if the link were shorter.

To control the duration of the lubricating function over broader limits, the hinge plate 47 can be replaced with a longer or shorter plate. It will be apparent that a longer plate will cause the wheel W to engage the plate for a longer period of time and thus, if the rate of speed of the conveyor remains unchanged, a longer plate 47 will increase the duration of the engagement of injector 71 with fitting Z.

The principal function of the link 33 is to establish the extent of inward movement of the injector 71. This adjustment is generally made by shortening the link 33 to cause greater movement of the rocker assembly. It will be noted that the resilient nature of link 33 prevents any damage due to over-travel of the crankbell 37. As soon as the injector 71 engages fitting Z, further movement of lever 37 will be absorbed by the expansion of the spring 34.

In the event that the injector 71 is in proper alignment with fitting Z in a vertical plane, but does not register properly horizontally, the condition can be remedied by raising or lowering the entire rocker assembly 23 in the slots 73 of brackets 16.

If the injector 71 is in proper registry horizontally, but moves in either too soon or too late, the condition is corrected by changing the position of slide-block 51 through adjustment of stop 60.

The operation of valve 63 can be correlated to the other adjustments by raising or lowering the valve, as necessary.

From the foregoing description it will be apparent that I have provided a lubricating device which will automatically lubricate each wheel of a conveyor in response to passage of said wheel through the device. By means of this device, correct lubrication is assured and the necessity of utilizing manual lubricating stations is obviated.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a lubricating device adapted to lubricate a wheel moving on a track, the combination of a rocker assembly pivotally secured to said track for movement transversely to the longitudinal axis of said track, a lubricant injector mounted on said rocker assembly and operatively engageable with said wheel in response to proper movement of said rocker assembly relative to said track, an actuating element slidably secured to said track in the path of movement of said wheel and movable in response to wheel movement in a direction normal to the direction of travel of said wheel, means provided on said rocker assembly and engageable by said actuating element to cause movement of at least a portion of said rocker assembly toward said track, and means responsive to said movement of said rocker assembly for forcing lubricant through said lubricant injector into said wheel.

2. In a lubricating device adapted to lubricate a wheel moving on a track, the combination of a rocker assembly pivotally secured to said track for movement transversely to the longitudinal axis of said track, a lubricant injector slidably mounted on said rocker assembly and operatively engageable with said wheel in response to proper movement of said rocker assembly relative to said track, an actuating element slidably secured to said track in the path of movement of said wheel and movable in response to wheel movement in a direction normal to the direction of travel of said wheel, means provided on said rocker assembly and engageable by said actuating element to cause movement of at least a portion of said rocker assembly toward said track, and means effective upon disengagement of said wheel from said actuating element for moving said portion of the rocker assembly away from said track.

3. In a lubricating device adapted to lubricate a wheel moving on a track, the combination of a rocker assembly pivotally secured to said track for movement in a plane transversely to the longitudinal axis of said track, a lubricant injector slidably mounted on said rocker assembly for movement in a line parallel to said track and operatively engageable with said wheel in response to proper movement of said rocker assembly relative to said track, an actuating element slidably mounted on said track in the path of movement of said wheel and displaced in response to wheel movement in a direction normal to the direction of travel of said wheel, and means provided on said rocker assembly and engageable by said actuating element to move at least a portion of said rocker assembly toward said track.

4. In a lubricating device adapted to lubricate a wheel moving on a track, the combination of a rocker assembly pivotally secured to the track for movement transversely to the longitudinal axis of said track, a lubricant injector slidably mounted on said rocker assembly for movement in a line parallel to said track, means yieldably retaining said lubricant injector against movement in the direction of travel of said wheel, adjustable means engaging said lubricant injector and selectively positioning said injector in opposition to said first means for operative engagement with said wheel, an actuating element slidably secured to said track in the path of movement of said wheel and displaceable in response to wheel movement in a direction normal to the direction of travel of said wheel, and means provided on said rocker assembly and engageable by said actuating element to move at least a portion of said rocker assembly toward said track.

5. A combination, as defined in claim 4, wherein said last named means comprises a lost motion link operatively connecting at least a portion of said rocker assembly and said actuating element.

6. A combination, as defined in claim 4, including means operatively engaging said actuating element in response to movement of said wheel through a predetermined distance past said actuating element.

7. In a lubricating device adapted to lubricate a wheel moving on a track, the combination of a rocker arm assembly pivotally secured to said track for movement transversely thereto, a lubricant injector slidably secured to said rocker arm assembly for movement in a line parallel to said track, an actuating element slidably secured to said track in the path of movement of said wheel, said actuating element being movable in response to wheel movement in a direction normal to the direction of travel of said wheel, a lost motion connector operatively linking at least a portion of said rocker arm assembly to said element for pivotal movement toward said track in response to wheel-induced movement of said actuating element; adjustable means for positioning said lubricant injector in registry with the axis of said wheel, and means responsive to said pivotal movement of said rocker arm assembly for forcing lubricant through said lubricant injector into said wheel.

References Cited in the file of this patent

UNITED STATES PATENTS

| 1,125,750 | Smith | Jan. 19, 1915 |
| 1,567,623 | Smith | Dec. 29, 1925 |
| 2,624,423 | Moore | Jan. 6, 1953 |

FOREIGN PATENTS

| 20,206 | Australia | Oct. 28, 1929 |
| 710,004 | Germany | Sept. 1, 1941 |